June 24, 1930. C. L. STOKES 1,766,313
HUB CAP
Filed Sept. 19, 1927
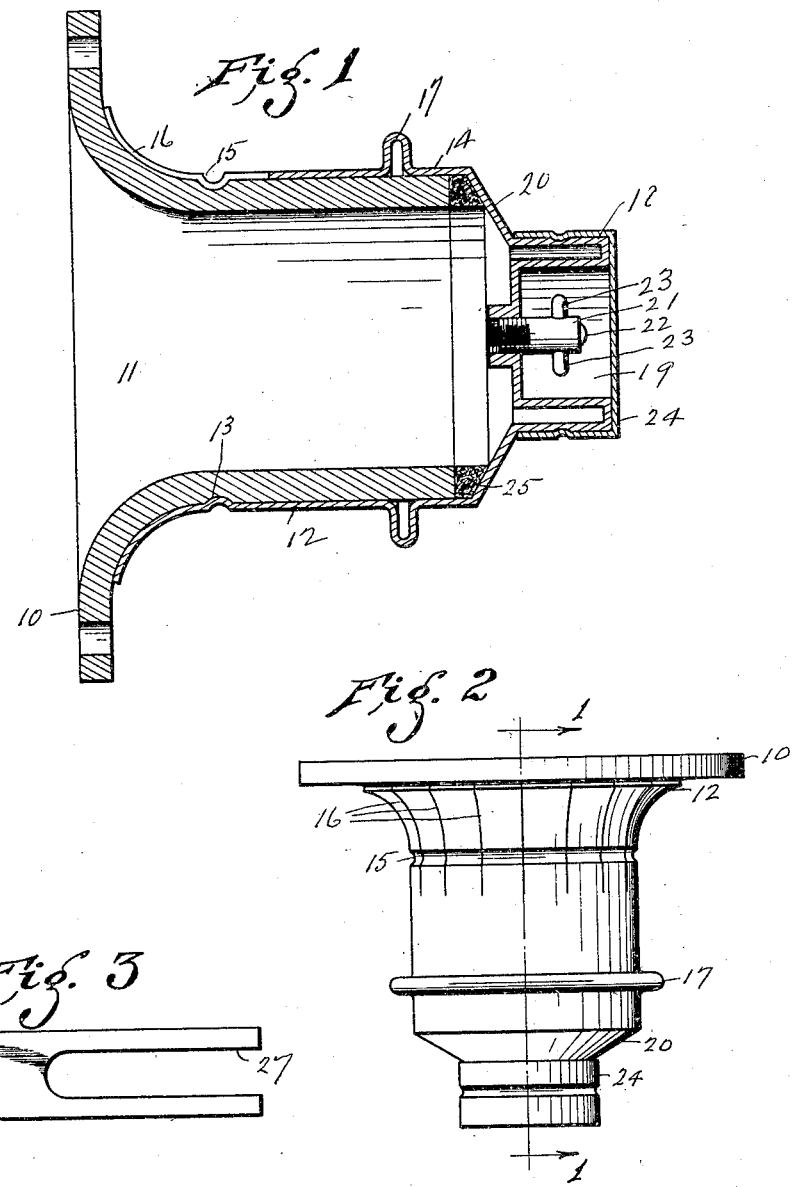
INVENTOR
Charles L. Stokes Patented June 24, 1930

1,766,313

UNITED STATES PATENT OFFICE

CHARLES L. STOKES, OF LOS ANGELES, CALIFORNIA

HUB CAP

Application filed September 19, 1927. Serial No. 220,399.

This invention relates to improvements in hub caps for closing the ends of hubs supporting wheels.

The principal object of the invention is to provide a cap of cheap construction which may be quickly attached to and detached from a hub.

Another object of the invention is to provide a quick attachable and detachable lubricant holding hub cap having simplified and protected means for forcing lubricant to the interior of the cap.

This application is a continuation in part of my co-pending application, Serial Number 671,593, filed October 29, 1923.

Referring to the drawings, in which the same numbers indicate like parts:—

Fig. 1 is a vertical cross section showing a hub having my hub cap attached thereto.

Fig. 2 is a view of the hub and hub cap.

Fig. 3 is an elevation showing a tool for removing the hub cap from the hub.

A hub 10 is one of the usual construction having a central bore 11 wherein is supported a spindle (not shown), hub 10 being fastened to a wheel (not shown), the wheel and hub 10 revolving on the spindle.

In order to keep dust and dirt out of bore 11 and to provide lubrication therein, the end of bore 11 is closed by a hub cap 12 which encircles the hub 10.

The usual construction of a cap for closing bore 11, particularly when used on the front wheel hubs of automobiles in modern practice, provides that hub 10 shall be threaded and cap 12 shall be threaded when the two are together, grease being forced through bore 11 by the action of screwing cap 12 on to hub 10. Inasmuch as the threads are usually very fine they are easily stripped by cross threading, particularly when it is attempted to force grease through bore 11 by applying cap 12 to hub 10. Also such threaded joints often become loose and the hub cap is lost from off the hub leaving bore 11 and the bearings therein exposed to dirt and also losing the lubricant therefrom.

It is my purpose to eliminate the labor of threading both hub 10 and hub cap 12 and screwing them together, while at the same time providing simplified and positive greasing means without removing hub cap 12. In so doing, hub cap 12 is positively held to hub 10 until removed by properly applied force.

Hub 10 is machined and has cut therein an annular groove 13 and hub cap 12 may be a stamping having a skirt 14 encircling hub 10 with small clearance, say about .004 inch.

Skirt 14 has a plurality of slits 16 therein adapted to form spring portions in the skirt to the end that a locking flange 15 in skirt 14 is firmly held in groove 13 when hub cap 12 is in the proper position. An unlocking flange 17 is formed on the outer end of hub cap 12 and it is to be noted that there is provided a considerable space between flanges 15 and 17 to the end that skirt 14 in its unsplit portion therebetween will have considerable bearing on hub 10 whereby blows, or shocks, will mainly be taken on the solid metal of hub 10 and cap 12 will not be knocked off therefrom.

The outer end of cap 12 is preferably of smaller diameter than skirt 14 and forms a portion 18 having a depression 19 therein and a shoulder 20 connects skirt 14 with portion 18.

Depression 19 supports a lubricating nipple 21 therein and centrally thereof, nipple 21 being of a well known type called "Alemite" on the market containing an inwardly opening check valve 22 and having bayonet points 23 for coacting with a so called high pressure grease gun, the system being well known to the public and described in United States patents. Space is provided in depression 19 to the end that the insertion of a grease gun therein may be permitted for coacting with nipple 21 whereby lubricant may be forced into bore 11 and the end of the grease gun may reach the bottom of depression 19 when locked on nipple 21. A dust cap 24 encloses depression 19 and a flexible gasket 25 which may be felt, cork, or other resilient material is fitted as an annular ring on the squared end of bore 11 and adapted to be held tight thereon to form a grease tight joint when locking flange 15 is forced into position in groove 13.

Cap 12 has a curved inner end adapted to abut on hub 10 and when assembly is desired all that is necessary to be done is to force said curved inner end over the open end of bore 11 and against the resistance to compression of the resilient annular gasket 25 until locking flange 15 is seated in groove 13 when everything is in place. A grease gun may then be attached to nipple 21 and bore 11 lubricated.

When it is desired to remove cap 12, a tool 26 is provided in the form of a yoke, the inner diameter of which is slightly larger than the outer diameter of skirt 14 but smaller than the diameter of unlocking flange 17. Tool 26 is placed on skirt 14, back of flange 17, and an outward pull is exerted on the ends of tool 26 of sufficient force to cause flange 15 to be sprung from groove 13 when the cap 12 is then easily removed.

Thus it is seen that a simple, grease tight, quickly attachable and detachable hub cap is provided easy of replacement and of low cost and having the features of providing greasing means without removing the cap.

I claim:—

1. The combination with an open-ended circular hub having an annular groove therearound, of a lubricant-holding cap for closing the hub, having a skirt of large diameter and a reduced portion of smaller diameter provided with a depression in the end thereof, a grease gun nipple within said depression and spaced from the side walls thereof, a shoulder between the skirt and reduced portion, a locking flange on the cap, and a grease-tight gasket held by said shoulder on the end of said hub when said locking flange is forced into said groove.

2. A lubricant-holding hub cap having a skirt provided with a resilient split portion, a locking flange on said split portion extending radially inwardly, said cap having a reduced portion provided with an end depression, a check valve secured in the bottom wall of said depression, the diameter of the reduced portion being smaller than the diameter of the skirt for forming a shoulder for holding a gasket against the end of a wheel hub.

Signed at Los Angeles, in the county of Los Angeles, and State of California, this 14th day of September, A. D. 1927.

CHARLES L. STOKES.